United States Patent
Singh et al.

(10) Patent No.: US 9,521,634 B2
(45) Date of Patent: Dec. 13, 2016

(54) APPARATUS AND METHOD FOR OPERATING M2M DEVICES

(75) Inventors: Shubhranshu Singh, Zhudong Township, Hsinchu County (TW); Kuei-Li Huang, Kaohsiung (TW); Jen-Shun Yang, Zhubei (TW); Stephen Gleixner, Zhubei (TW); Ching-Wen Cheng, Tainan (TW)

(73) Assignee: Industrial Technology Research Institute, Hsinchu (TW)

( * ) Notice: Subject to any disclaimer, the term of this patent is extended or adjusted under 35 U.S.C. 154(b) by 86 days.

(21) Appl. No.: 13/239,249

(22) Filed: Sep. 21, 2011

(65) Prior Publication Data

US 2013/0073746 A1 Mar. 21, 2013

(51) Int. Cl.
*H04W 56/00* (2009.01)
*H04W 52/02* (2009.01)

(52) U.S. Cl.
CPC ......... *H04W 56/00* (2013.01); *H04W 52/0219* (2013.01); *H04W 52/0235* (2013.01)

(58) Field of Classification Search
USPC ....................................................... 709/248
See application file for complete search history.

(56) References Cited

U.S. PATENT DOCUMENTS

| | | | |
|---|---|---|---|
| 8,416,741 B2 * | 4/2013 | Chan et al. | 370/329 |
| 2006/0274764 A1 | 12/2006 | Mah et al. | |
| 2008/0058031 A1 | 3/2008 | Deprun | |
| 2008/0107056 A1 * | 5/2008 | Choi et al. | 370/311 |
| 2010/0284316 A1 | 11/2010 | Sampathkumar | |
| 2011/0142029 A1 * | 6/2011 | Kasslin et al. | 370/350 |
| 2011/0171953 A1 * | 7/2011 | Faccin et al. | 455/426.1 |
| 2011/0195709 A1 * | 8/2011 | Christensson et al. | 455/426.1 |
| 2012/0252517 A1 * | 10/2012 | Karampatsis | H04W 4/005 455/515 |
| 2013/0044658 A1 * | 2/2013 | Zhu et al. | 370/311 |
| 2013/0044659 A1 * | 2/2013 | Jokimies et al. | 370/311 |
| 2013/0315121 A1 * | 11/2013 | Sampathkumar | 370/311 |

FOREIGN PATENT DOCUMENTS

| | | |
|---|---|---|
| CN | 101588545 A | 11/2009 |
| EP | 1 207 654 A2 | 5/2002 |
| WO | WO 2011/082150 A1 | 7/2011 |

OTHER PUBLICATIONS

Office Action issued by Taiwanese Patent Office (TIPO) in counterpart Taiwanese Application No. 101109511 dated Jan. 22, 2015.

* cited by examiner

*Primary Examiner* — Anthony Mejia
*Assistant Examiner* — Joseph M Cousins
(74) *Attorney, Agent, or Firm* — Finnegan, Henderson, Farabow, Garrett & Dunner LLP

(57) ABSTRACT

A method for operating a machine-to-machine (M2M) device communicating with a gateway includes determining, by the gateway, a timing parameter for synchronizing the machine-to-machine device with the gateway; inserting the timing parameter into a control signal; and transmitting the control signal from the gateway to the machine-to-machine device.

27 Claims, 11 Drawing Sheets

APPARATUS AND METHOD FOR OPERATING M2M DEVICES

TECHNICAL FIELD

This disclosure relates to apparatus and method for operating machine-to-machine (M2M) devices in a communication system.

BACKGROUND

A machine-to-machine (M2M) system, also known as a machine-type-communication (MTC) system, is a communication system that enables a flow of data, e.g., monitored data, from machine to machine and/or from machine to human with minimal human interactions. Examples of the M2M system include security systems, surveillance systems, smart meter systems, etc.

A conventional M2M system includes one or more M2M devices, an M2M server, and a wireless network provided by a service provider that may cover a large number of M2M devices. The M2M devices may be used in different applications including, e.g., electricity, water, or gas consumption monitoring, remote health monitoring, inventory applications, etc. The M2M devices are configured to send monitored data through the wireless network to the M2M server for further processing or analysis.

Typically, the wireless network operates in accordance with a wireless communication standard, such as a 3rd Generation Partnership Project (3GPP) standard. Currently, however, the wireless network configured to operate in accordance with the 3GPP standard may communicate with those M2M devices that are directly connected using a 3GPP interface.

Further, the M2M devices are often small and power-constrained. In many cases, the service life of these devices varies from several months to years and depends on how efficiently they utilize their internal energy source (e.g., batteries).

SUMMARY

According to one aspect of the present disclosure, there is provided a method for operating machine-to-machine devices in a wireless network. The method comprises determining, by a gateway, a timing parameter for synchronizing a plurality of machine-to-machine devices with the gateway; inserting the timing parameter into a control signal; and transmitting the control signal from the gateway to the machine-to-machine devices.

According to another aspect of the present disclosure, there is provided a non-transitory computer-readable medium comprising program codes, which, when executed by a processor, cause the processor to perform a method at a gateway for operating machine-to-machine devices in a wireless network. The method comprises: determining a timing parameter for synchronizing a plurality of machine-to-machine devices to the gateway; inserting the timing parameter into a control signal; and transmitting the control signal from the gateway to the plurality of machine-to-machine devices.

According to still another aspect of the present disclosure, there is provided a method for operating a machine-to-machine device in a wireless network. The method comprises: periodically switching a machine-to-machine device between a first operation mode and a second operation mode in accordance with a time interval; receiving, by the machine-to-machine device, a control signal carrying a timing parameter; extracting the timing parameter from the control signal; and adjusting the time interval in accordance with the timing parameter.

According to still another aspect of the present disclosure, there is provided a non-transitory computer-readable medium comprising program codes, which, when executed by a processor, cause the processor to perform a method for operating a machine-to-machine device in a wireless network. The method comprises: periodically switching a machine-to-machine device between a first operation mode and a second operation mode in accordance with a time interval; receiving a control signal carrying a timing parameter; extracting the timing parameter from the control signal; and adjusting the time interval in accordance with the timing parameter.

According to still another aspect of the present disclosure, there is provided a method for operating a machine-to-machine device in a wireless network. The method comprises: determining, by a gateway, a timing parameter; inserting the timing parameter into a control signal; transmitting the control signal to a plurality of machine-to-machine devices through a first network; extracting, by the machine-to-machine devices, the timing parameter from the control signal; and switching the machine-to-machine devices between a first operation mode and a second operation mode in accordance with the timing parameter.

According to still another aspect of the present disclosure, there is provided a system for operating a machine-to-machine device in a wireless network. The system comprises: a gateway connected between a first network and a second network, the gateway configured to determine a timing parameter, insert the timing parameter into a control signal, and transmit the control signal through a first network; and a machine-to-machine device connected to the first network, the machine-to-machine device configured to receive the control signal, extract the timing parameter from the control signal, and switch between a first operation mode and a second operation mode in accordance with the timing parameter.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DESCRIPTION OF THE EMBODIMENTS

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of systems and methods consistent with aspects related to the invention as recited in the appended claims.

Figure 1:
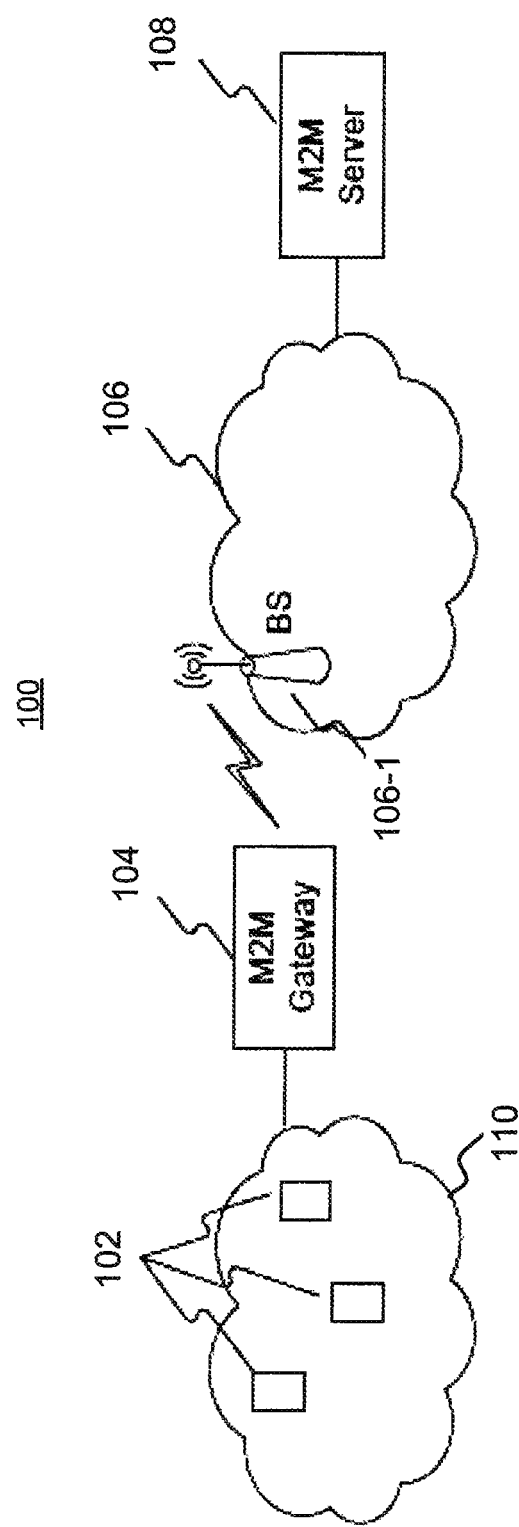
FIG. 1 illustrates a block diagram of an M2M system, according to an exemplary embodiment.

FIG. 1 illustrates a block diagram of a machine-to-machine (M2M) system 100, according to an exemplary embodiment. Referring to FIG. 1, the system 100 includes one or more M2M devices 102, an M2M gateway 104, a wireless network 106, at least one M2M server 108, and another wireless network 110. The wireless network 106 and the wireless network 110 operate in accordance with one or more communication standards. For illustrative purposes, it is assumed that the wireless network 106 operates in accordance with the 3rd Generation Partnership Project (3GPP) standard, and is therefore a 3GPP network. It is further assumed that the wireless network 110 operates in accordance with the IEEE 802.11 standard and is referred to as a capillary network.

In exemplary embodiments, the M2M devices 102, connected to the capillary network 110, may each be a monitoring device for monitoring data to be sent to the M2M server 108 for further processing or analysis. The M2M devices 102 may be used in different applications including, e.g., electricity, water, or gas consumption monitoring, remote health monitoring, inventory applications, etc. In addition, the M2M devices 102 may be grouped as one or more groups of M2M devices based on common features, locations, etc. The M2M devices 102 may each be connected to the M2M gateway 104. Accordingly, the M2M devices 102 may have a wired interface, or a wireless interface, such as a Wi-Fi interface, a Bluetooth interface, a Zigbee interface, a radio-frequency identification (RFID) interface, etc. The wireless interface of the M2M devices may operate in accordance with one or more communication standards, such as the IEEE 802.11 standard. Further details of the M2M devices 102 will be described below.

In exemplary embodiments, the M2M gateway 104 is configured to couple the M2M devices 102 to the 3GPP network 106. The M2M gateway 104 may include one or more of the following components: a processor configured to execute computer program instructions to perform various processes and methods disclosed herein, random access memory (RAM) and read only memory (ROM) configured to access and store information and computer program instructions, storage to store data and information, databases to store tables, lists, or other data structures, I/O devices, network interfaces, antennas, etc. Further detail of the M2M gateway 104 will be described below.

In exemplary embodiments, the 3GPP network 106 is a wireless communication network provided by a service provider that operates in accordance with the 3GPP standard. For example, the 3GPP network 106 includes at least one base station (BS) 106-1, also known as the eNodeB. When the M2M gateway 104 is located within a coverage area of the base station 106-1, the base station 106-1 may communicate with the M2M gateway 104. In addition, the base station 106-1 may also communicate with user terminals (not shown) located in the 3GPP network 106.

In exemplary embodiments, the 3GPP network 106 may also include the following components (not shown): a new mobility management entity (MME) that the M2M gateway 104 is to communicate with, an old MME or serving GPRS Support Node (SGSN) that the M2M gateway 104 previously communicated with, a serving gateway (GW), a packet data network (PDN) GW, a policy and charging rules function (PCRF), and a home subscriber server (HSS). Each of these components is defined in the 3GPP standard and will not be explained further.

In exemplary embodiments, the M2M server 108 is configured to communicate with the 3GPP network 106. For example, the M2M server 108 may receive monitored data from the M2M devices 102 through the M2M gateway 104 and the 3GPP network 106. Also for example, the M2M server 108 may send control information to the M2M devices 102 through the M2M gateway 104 and the 3GPP network 106.

Figure 2A:
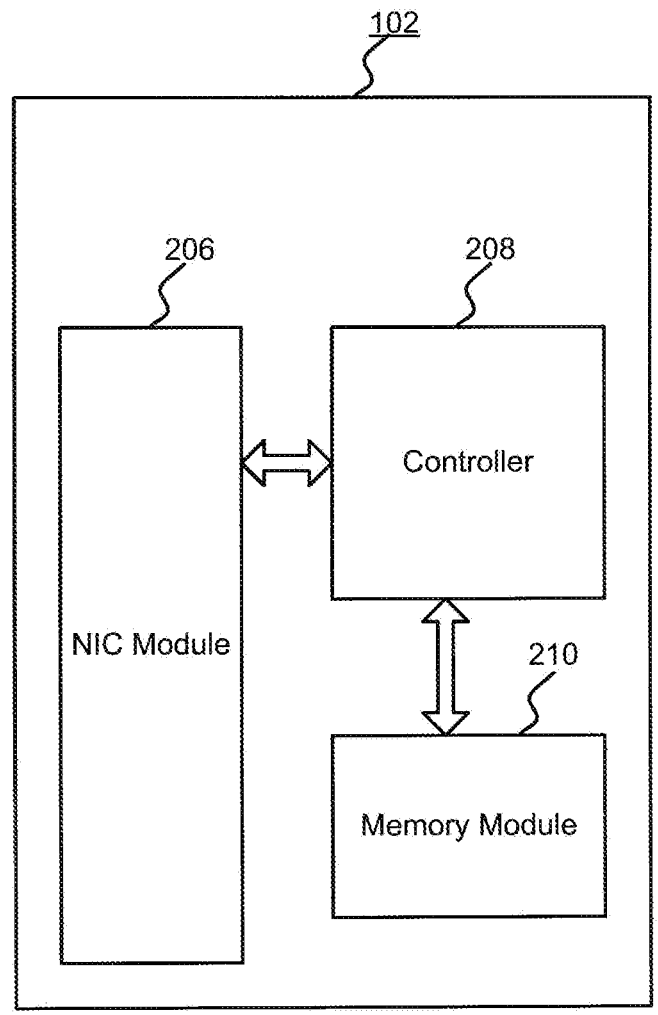
FIG. 2A illustrates a block diagram of an M2M device, according to an exemplary embodiment.

FIG. 2A illustrates a block diagram of the M2M device 102, shown in FIG. 1, according to exemplary embodiments. Referring to FIGS. 1 and 2A, the M2M device 102 includes, at least, a network interface controller (NIC) module 206 for communicating with the M2M gateway 104, a controller 208 for executing program codes to process data and to control the M2M device 102, and a memory module 210 for storing the data and the program codes.

In exemplary embodiments, the NIC module 206 is configured to communicate with the M2M gateway 104 using one or more network interfaces, such as a Wi-Fi interface, a Bluetooth interface, a Zigbee interface, and an RFID interface. The NIC module 206 may provide periodic or non-periodic communications between the M2M device 102 and the M2M gateway 104. For example, the NIC module 206 may periodically transmit data, such as information on temperature, pressure, etc., to the M2M gateway 104.

In addition, the NIC module 206 may transmit, periodically or non-periodically, a beacon request to the M2M gateway 104 and receive a beacon signal from the M2M gateway 104 as a response to the request. Alternatively, the M2M device 102 may, without sending the beacon request, receive periodic beacon signals through the NIC module 206 in accordance with a time interval, which comprises one or more beacon intervals (BIs).

In exemplary embodiments, the operation of the M2M device 102 may be compliant with a communication standard, such as the IEEE 802.11 standard. Accordingly, the beacon signal may comprise a management frame as defined in the IEEE 802.11 standard for wireless local area networks (WLANs). The beacon signal may contain information about the capillary network 110 and the M2M gateway 104 and other management information. The components of the beacon signal are defined in the IEEE 802.11 standard specification.

The controller 208 of the M2M device 102 may be a micro-processor or a central processing unit (CPU), as known in the art. The controller 208 exchanges data with the NIC module 206 and the memory module 210. In addition, the controller 208 retrieves program codes from the memory module 210 and executes the program codes to process the data received from the NIC module 206 and the memory module 210. The controller 208 also causes the M2M device 102 to carry out processes described herein in accordance with the program codes.

The memory module 210 of the M2M device 102 stores the data and programs for controlling the M2M device. The memory module 210 may be a RAM, a ROM, a flash memory, or other computer-readable media as known in the art.

In exemplary embodiments, the controller 208, by executing the program codes stored in the memory module 210, switches the M2M device 102 between a doze mode (i.e., a power-saving mode) and a normal operation mode, in order to reduce power consumption while providing necessary communications with the M2M gateway 104. For example, when the NIC module 206 transmits data to the M2M gateway 104, the controller 208 causes the M2M device 102 to operate in the normal operation mode, in which power consumption is high. When the NIC module 206 does not transmit data to the M2M gateway 104, on the other hand, the controller 208 causes the M2M device 102 to operate in the doze mode.

In exemplary embodiments, the controller 208 causes the M2M device 102 to switch, periodically or non-periodically, between the doze mode and the normal operation mode. The frequency of the switching between the two modes may be adjusted in accordance with the status of the M2M device 102 and the status of the M2M gateway 104. For example, the M2M device 102 may be operated by switching between the doze mode and the normal operation mode in synchronism with operations of the M2M gateway 104 based on information received from the M2M gateway 104.

In one embodiment, the M2M device 102 periodically switches between the doze mode and the normal operation mode in accordance with a time interval (e.g., a Listen Interval). The Listen Interval (LI) defines how often the M2M device 102 in power-saving mode wakes up to listen to the beacon signal. According to the IEEE 802.11 standard, the Listen Interval is measured in units of Beacon Interval. Within the Listen Interval, the M2M device 102 does not transmit or process data. At the end of the Listen Interval, the controller 208 causes the M2M device 102 to "wake up" or switch to the normal operation mode. During the normal operation mode, the controller 208 processes data and monitors incoming signals to listen to a beacon signal from the M2M gateway 104. In a further embodiment, the Listen Interval of the M2M device 102 may be substantially greater than the time interval for the normal operation mode.

In exemplary embodiments, the Listen Interval may be pre-configured in the memory module 210, for example, when the M2M device 102 joins the network 110. Alternatively, the Listen Interval may be dynamically adjusted based on data and parameters received from the M2M gateway 104. Determination of the Listen Interval will be further described below.

Figure 2B:
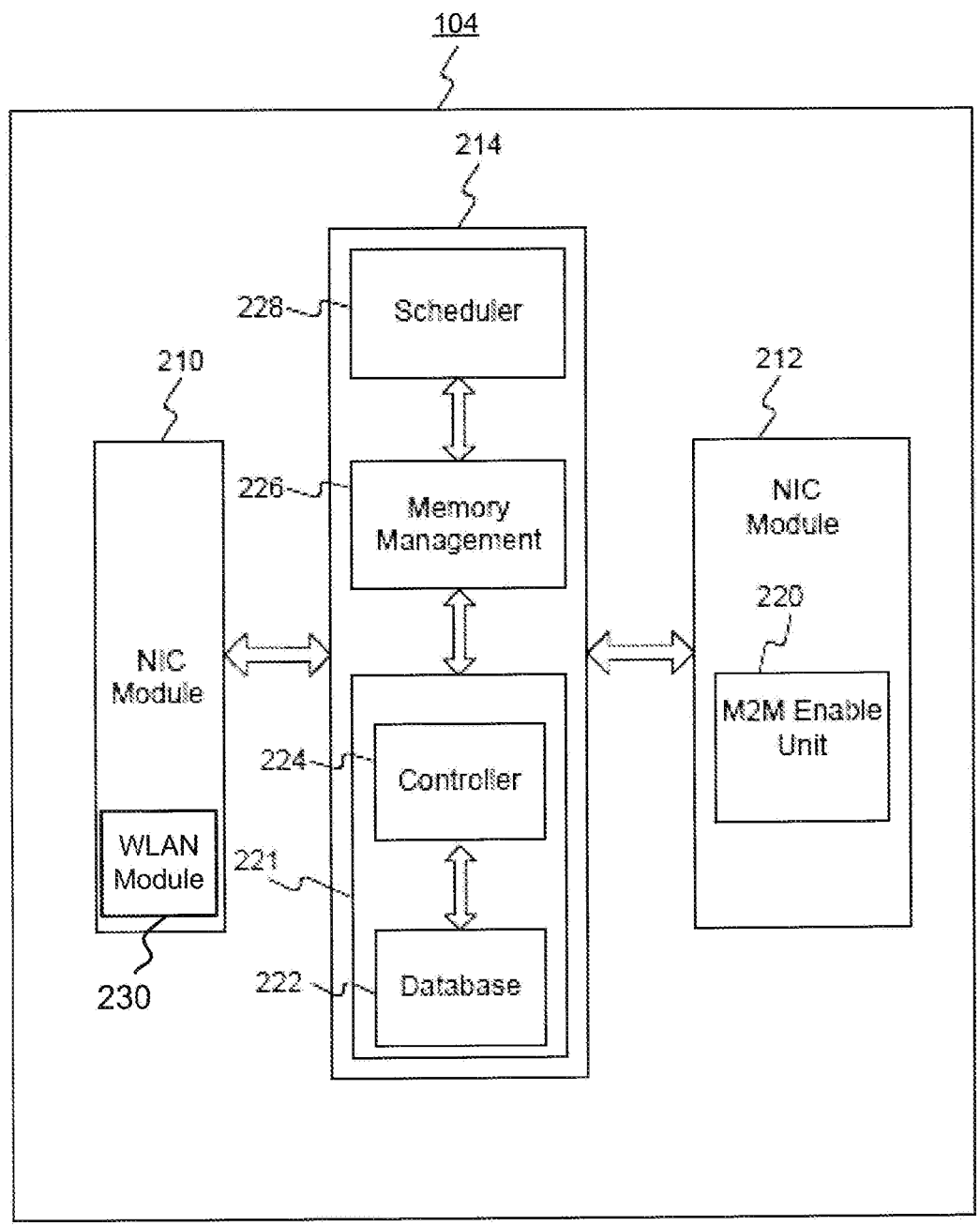
FIG. 2B illustrates a block diagram of an M2M gateway, according to an exemplary embodiment.

FIG. 2B illustrates a block diagram of the M2M gateway 104, shown in FIG. 1, according to an exemplary embodiment. Referring to FIGS. 1 and 2B, the M2M gateway 104 includes a non-3GPP network interface controller (NIC) module 210 for communicating with the M2M devices 102, a 3GPP NIC module 212 for communicating with the 3GPP network 106, and a core module 214 coupled to the non-3GPP NIC module 210 and the 3GPP NIC module 212. Each of the non-3GPP NIC module 210, the 3GPP NIC module 212, and the core module 214 may be implemented by one or more processors and a non-transitory computer-readable medium.

In exemplary embodiments, the non-3GPP NIC module 210 is configured to communicate with the M2M devices 102 using one or more non-3GPP interfaces, such as a Wi-Fi interface, a Bluetooth interface, a Zigbee interface, and an RFID interface. For example, the non-3GPP NIC module 210 may transmit periodic beacon signals to the M2M devices 102. The transmissions of the beacon signals will be further described below.

In exemplary embodiments, the core module 214 includes an M2M controller unit 221, which further includes a database 222 and a controller 224. The controller unit 221 stores information regarding the M2M devices 102 in the database 222 and retrieves information regarding the M2M devices 102 from the database 222. The core module 214 also includes a memory manager 226 to manage memory usage by the database 222, and a communication scheduler 228 to schedule communications between the M2M gateway 104 and the M2M devices 102 and communications between the M2M gateway 104 and the 3GPP network 106.

In exemplary embodiments, the 3GPP NIC module 212 includes, apart from a standard 3GPP protocol stack, an M2M enable unit 220 configured to control and monitor the M2M devices 102. For example, the M2M enable unit 220 may send initial information regarding the M2M devices 102 to the 3GPP network 106 based on, e.g., as part of, an initial attach process provided in the 3GPP standard. Also for example, the M2M enable unit 220 may send, periodically or non-periodically, updated information regarding the M2M devices 102 to the 3GPP network 206 based on a Tracking Area Update (TAU) process provided in the 3GPP standard.

In exemplary embodiments, the M2M gateway 104 may also switch, periodically or non-periodically, between a power-saving mode (i.e., an idle mode) and a normal operation mode based on a TAU interval. For example, when the M2M gateway 104 transmits TAU messages to the 3GPP network 106, or for a time period after the M2M gateway 104 transmits the TAU messages to the 3GPP network 106, the M2M gateway 104 may operate in the normal operation mode. After that time period, the M2M gateway 104 stops transmitting and/or receiving data or messages to the 3GPP network 106 or the M2M server 108. Accordingly, the M2M gateway 104 may then enter the power-saving mode until the next TAU message is transmitted. The TAU interval may be updated or adjusted according to the 3GPP standard.

In exemplary embodiments, the M2M gateway 104 may utilize a TAU timer to control the switching between the power-saving mode and the normal operation mode. For example, the controller 224 starts a timer having a preset time length, when the M2M gateway 104 enters the power-saving mode. When the timer expires, the M2M gateway switches to the normal operation mode and transmits TAU messages to the 3GPP network 106. The controller 224 may further update, periodically or non-periodically, the preset time length of the timer. Further details of the TAU interval will be discussed below with reference to FIGS. 3-10.

Figure 3:
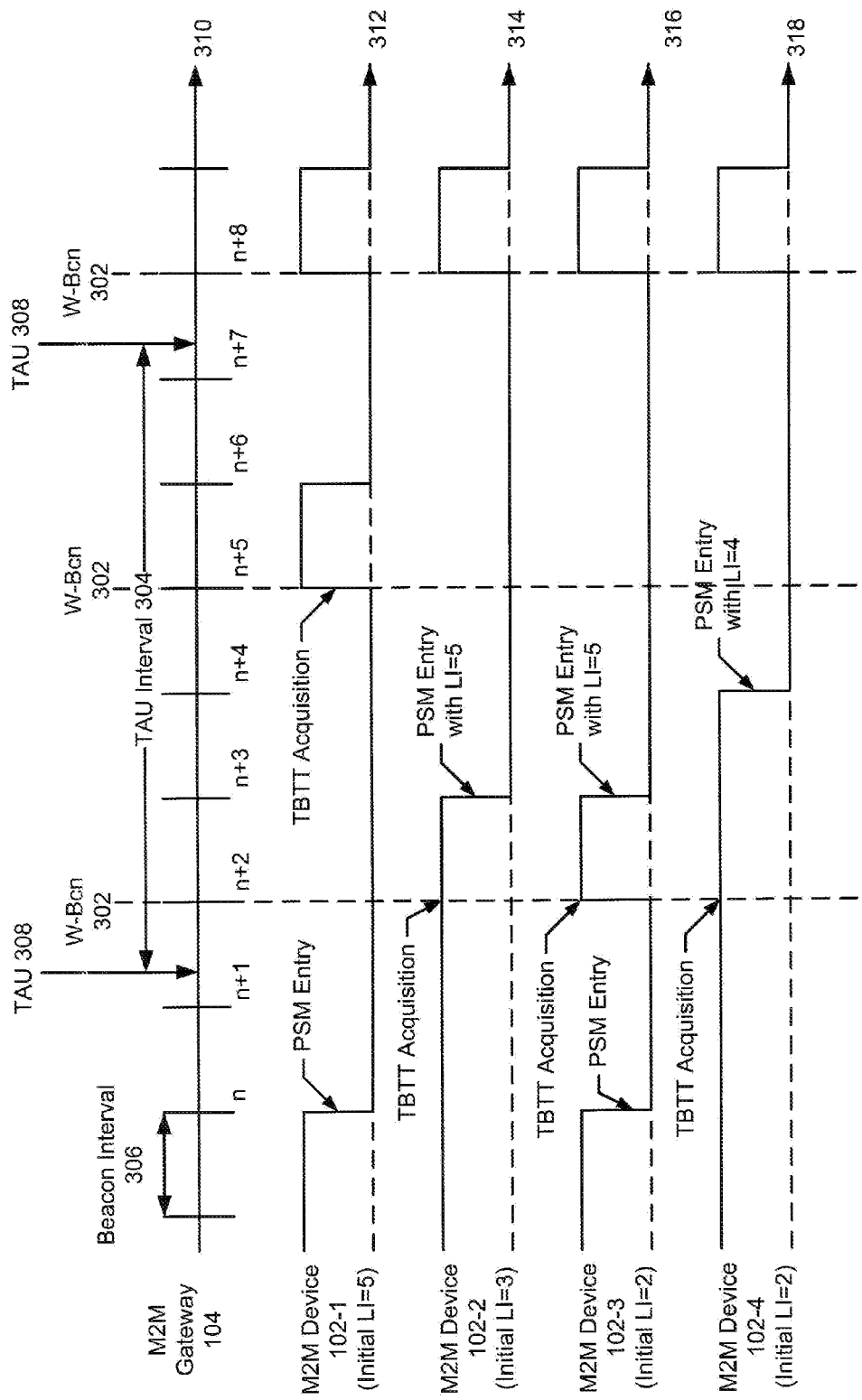
FIG. 3 illustrates a timing diagram for synchronizing a plurality of M2M devices with an M2M gateway, according to an exemplary embodiment.
Figure 4:
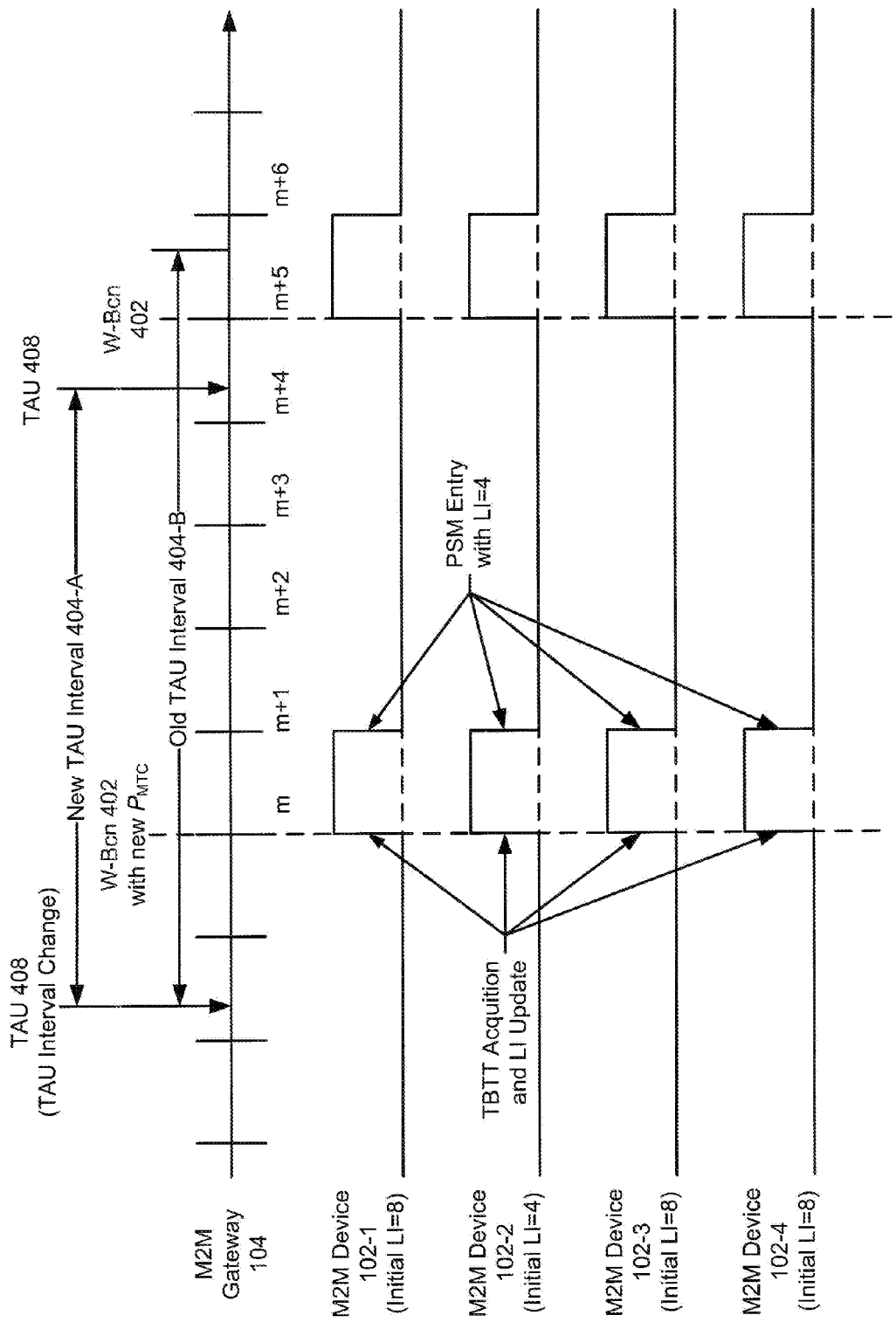
FIG. 4 illustrates a process for synchronizing a plurality of M2M devices with an M2M gateway when a Tracking Area Update (TAU) interval of the M2M gateway decreases, according to an exemplary embodiment.
Figure 5:
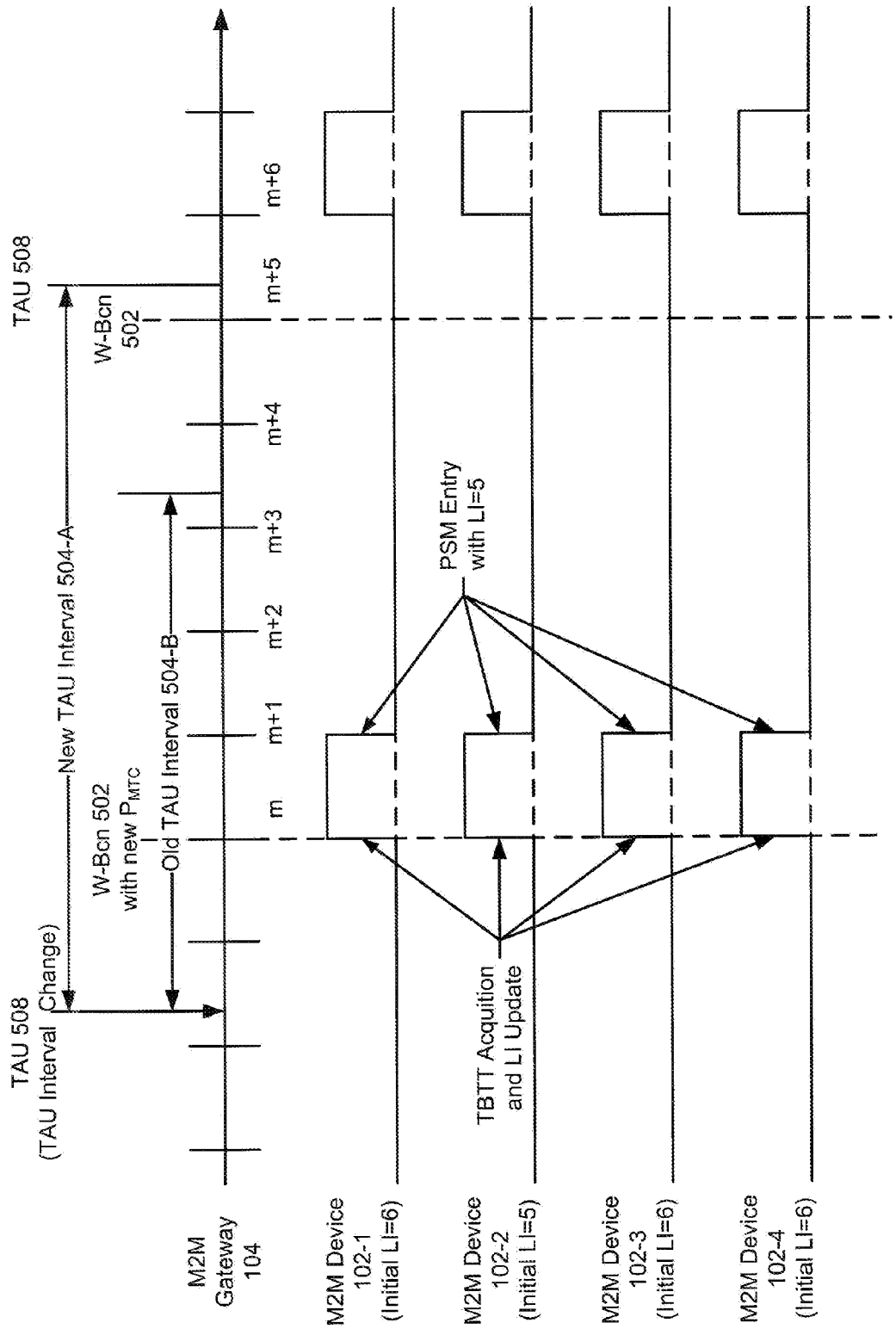
FIG. 5 illustrates a process for synchronizing a plurality of M2M devices with an M2M gateway when the Tracking Area Update (TAU) interval of the M2M gateway increases, according to an exemplary embodiment.

FIGS. 3-5 depict various timing diagrams of processes for operating the M2M device 102, such as synchronizing the power-saving modes of the M2M devices 102 with the operations of the M2M gateway 104, according to exemplary embodiments.

FIG. 3 illustrates a timing diagram of a process according to an exemplary embodiment, in which the power-saving modes of four M2M devices (i.e., 102-1, 102-2, 102-3, and 102-4), each having a different initial Listen Interval, are synchronized with the operation of the M2M gateway 104. In FIG. 3, the basic unit for measuring the timing diagram is a beacon interval 306. Lines 310, 312, 314, 316, and 318 represent running of local times at the M2M gateway 104 and the four M2M devices 102, respectively.

As depicted in FIG. 3, the M2M gateway 104 transmits periodic or non-periodic TAU messages (i.e., TAU 308) to the 3GPP network 106. For periodic TAU messages, the M2M gateway 104 keeps track of a TAU interval 304 by using a TAU timer. For example, the M2M gateway 104 starts the TAU timer upon transmitting a TAU 308 to the 3GPP network 106. When the TAU timer expires, the M2M gateway 104 transmits another TAU 308. The TAU message 308 may also be sent periodically or non-periodically in accordance with various TAU conditions defined in the 3GPP standard. The TAU interval 304 between two consecutive TAU messages 308 may be adjusted according to a number of conditions as specified in the 3GPP standard.

Furthermore, the M2M gateway 104 may transmit periodic beacon signals (i.e. W-Bcn 302) to the M2M devices 102-1, 102-2, 102-3, and 102-4, as defined in the IEEE 802.11 standard. The time interval between consecutive beacon signals 302 may be equal to multiple beacon intervals.

The beacon signals 302 carry the most recent TAU interval 304 of the M2M gateway 104 in, for example, a Vendor Specific field of the beacon signal As depicted in FIG. 3, the M2M gateway 104 transmits the first TAU 308 between time n+1 and time n+2. According to the TAU interval 304, the M2M gateway 104 transmits the next TAU 308 between time n+7 and time n+8.

As further depicted in FIG. 3, the M2M devices 102-1, 102-2, 102-3, and 102-4 have different initial Listen Intervals. For example, the initial Listen Interval of the M2M device 102-1 is equal to five (5) beacon intervals. The initial Listen Interval of the M2M device 102-2 is equal to three (3) beacon intervals. The initial Listen Intervals of the M2M devices 102-3 and 102-4 are each equal to two (2) beacon intervals.

Due to the differences in their initial Listen Intervals, the M2M devices 102 switch between the power-saving mode (PSM) and the normal operation mode at different points in time or out of synchronism. For example, the M2M devices 102-1 and 102-3 switch to the PSM at time n. The M2M device 102-2 switches to the PSM at time n+3. The M2M device 102-4 switches to the PSM at time n+4.

However, the TAU interval 304 carried in the beacon signals 302 allows the M2M devices 102 to adjust their Listen Intervals so that their switching between the PSM and the normal operation mode is synchronized with the transmission of the TAU message 308.

As illustrated in FIG. 3, the M2M gateway 104 transmits the beacon message 302 at time n+2, which carries the most recent TAU interval 304, to the M2M devices 102. The M2M device 102-1 enters the PSM at time n and does not receive the TAU interval 304 carried in the beacon signal 302 until it wakes up at time n+5. At time n+5, the M2M device 102-1 switches to the normal operation mode to receive and process data. Specifically, the M2M device 102-1 receives the beacon signal 302 carrying a timing parameter, such as the TAU interval 304. Based on the timing parameter carried in the beacon signal 302, the M2M device 102-1 determines the TBTT to be at time n+8, which falls immediately behind the next TAU 308. Accordingly, the M2M device 102-1 updates its Listen Interval to two (2) beacon intervals so that the M2M device 102-1 switches from the PSM to the normal operation mode at time n+8.

The M2M device 102-2 receives the beacon signal 302 at n+2, when it is in the normal operation mode. Similarly, the M2M device 102-2 determines, based on the received beacon signal 302, the time to wake up is at time n+8. As a result, the M2M device 102-2 updates its Listen Interval to five (5) beacon intervals so that the M2M device 102-2 switches back to the normal operation mode at time n+8.

The M2M device 102-3 receives the beacon signal 302 when it is switching from the PSM to the normal operation mode. Similarly, the M2M device 102-3 updates its Listen Interval based on the received beacon signal 302. The M2M device 102-3 updates its Listen Interval to five (5) beacon intervals so that it switches back to the normal operation mode at time n+8.

The M2M device 102-4 receives the beacon signal 302 during its normal operation mode. Therefore, similar to the M2M device 102-2, the M2M device 102-4 updates its Listen Interval to four (4) beacon intervals so that it switches back to the normal operation mode at time n+8.

After adjusting their Listen Intervals based on the received beacon signal 302, the power-saving modes of all of the M2M devices 102 are synchronized with the transmission of the TAU messages. This synchronism provides new Listen Intervals, which cause the M2M devices 102 to stay in the PSM for as long as the most recent TAU interval 304 allows. Accordingly, each of the M2M devices 102 synchronizes with the M2M gateway 104 by adjusting its Listen Interval in accordance with the TAU interval 304 of the M2M gateway 104. This also reduces unnecessary switching by the M2M devices 102 in order to wake-up to listen or check for any possible data transmitted from the gateway. The Listen Intervals of the M2M devices 102 may be dynamically increased or decreased, in accordance with the TAU interval 304 and/or other timing parameters carried in the beacon signal from the M2M gateway 104. The M2M devices 102 may be configured to operate in the normal operation mode to receive data from or transmit data to the M2M gateway 104 during only specific time intervals (e.g., the beacon interval starting at time n+8). This time internal for the normal operation mode may be synchronized to begin after the M2M gateway 104 transmits a TAU message 302 to the 3GPP network 106.

Alternatively, instead of transmitting the TAU interval 304 to the M2M devices 102, the M2M gateway 104 itself may calculate the TBTT based on the current TAU interval 304 and send the TBTT to the M2M devices 102. For example, the M2M gateway 104 may insert the TBTT into the Vendor Specific field of the beacon signal and transmit the beacon signal to the M2M devices 102. Accordingly, the M2M device 102, upon receiving the beacon signal carrying the TBTT, may update their Listen Intervals, as described above.

In exemplary embodiments, the TAU interval 304 changes in accordance with certain TAU conditions as specified in the 3GPP standard. Hence, the Listen Intervals of the M2M devices 102 change accordingly, in synchronism with the TAU interval 304. FIGS. 4 and 5 depict the timing diagrams of processes according to exemplary embodiments, in which the M2M devices 102 adjust their Listen Intervals in accordance with changes in the TAU interval 304.

FIG. 4 depicts an exemplary embodiment of a process for operating a plurality of M2M devices, such as synchronizing the power-saving modes of a plurality of M2M devices with the operation of the M2M gateway 104, where the TAU interval is decreased for subsequent TAU messages (i.e., a new TAU interval 404-A is shorter than an old TAU interval 404-B). As depicted in FIG. 4., the power-saving modes of the M2M devices 102 are initially synchronized with the old TAU interval 404-B of the M2M gateway in a process similar to that described above with reference to FIG. 3. During the initial Listen Interval prior to time m, the M2M gateway 104 changes the TAU interval in response to certain events as specified in the 3GPP standard. The M2M gateway 104 then starts to transmit the TAU message 408 in accordance with the new TAU interval 404-A. Thereafter, the M2M gateway 104 transmits a beacon signal 402 to the M2M devices 102 at time m, carrying the new TAU interval 404-A or a timing parameter $P_{MTC}$ corresponding to the new TAU interval 404-A.

At time m, the M2M devices 102 receive the beacon signal 402 carrying the new TAU interval 404-A and other timing parameters and determine the TBTT based on the new TAU interval 404-A. The M2M devices 102 then update their Listen Intervals in accordance with the TBTT. As depicted in FIG. 4, the M2M devices 102 determine the TBTT to be time m+5 and hence update the Listen Intervals of the M2M devices 102 to four (4) beacon intervals. At time m+1, the M2M devices 102 enter the PSM with the updated Listen Interval (i.e., LI=4 beacon intervals). Thereafter, instead of switching back to the normal operation mode at time m+6 under the old TAU interval 404-B, the M2M devices 102 may now "wake up" at time m+5, after the transmission of the subsequent TAU message 408 by the M2M gateway. As a result, the power-saving modes of the M2M devices 102 are again synchronized to the transmission of the TAU messages under the new TAU interval 404-A.

FIG. 5 depicts an exemplary embodiment of a process for operating the M2M devices 102, such as synchronizing the power-saving modes of the M2M devices with the operation of M2M gateway 104, where the TAU interval is increased (i.e., a new TAU interval 504-A is greater than an old TAU interval 504-B). As depicted in FIG. 5, the power-saving modes of the M2M devices 102 are initially synchronized with the old TAU interval 504-B of the M2M gateway 104 in a process similar to those described above with reference to FIGS. 3 and 4. During the initial Listen Interval prior to time m, the M2M gateway 104 changes the TAU interval in response to conditions as specified in the 3GPP standard. The M2M gateway 104 then starts to transmit the TAU message 508 in accordance with the new TAU interval 504-A. Thereafter, the M2M gateway 104 transmits a beacon signal 502 to the M2M devices 102 at time m, carrying the new TAU interval 504-A or a timing parameter $P_{MTC}$ indicative of the new TAU interval 504-A.

At time m, the M2M devices 102 receive the beacon signal 502, which carries the new TAU interval 504-A and other timing parameters, and determine the TBTT based on the beacon signal 502. The M2M devices 102 then update their Listen Intervals in accordance with the TBTT. As depicted in FIG. 5, the Listen Intervals of the M2M devices 102 are updated to five (5) beacon intervals in accordance with the new TAU interval 504-A. At time m+1, the M2M devices 102 enter the PSM with the updated Listen Interval (i.e., LI=5 beacon intervals). Thereafter, instead of switching back to the normal operation mode at time m+4 under the old TAU interval 504-B, the M2M devices 102 now "wake up" at time m+6, after the transmission of the subsequent TAU message 508 under the new TAU interval 504-A. As a result, the operations of the M2M devices 102 are synchronized to the new TAU interval 504-A of the M2M gateway 104.

In alternative embodiments, the M2M gateway 104 itself may determine the TBTT and transmit the TBTT in addition to or instead of the TAU interval to the M2M devices 102. Accordingly, the M2M devices 102 may update their Listen Interval in accordance with the received TBTT. In accordance with another alternative, the M2M gateway 104 may determine the Listen Interval for teach M2M device based on the TAU interval, and transmit the Listen Interval to the M2M devices.

As discussed above, the new wake-up time of the M2M devices 102 may be later or earlier than the wake-up time determined based on the previous TBTT, depending on the new TAU interval. In either case, the operations of the M2M devices 102 are synchronized with the TAU transmissions.

Figure 6:
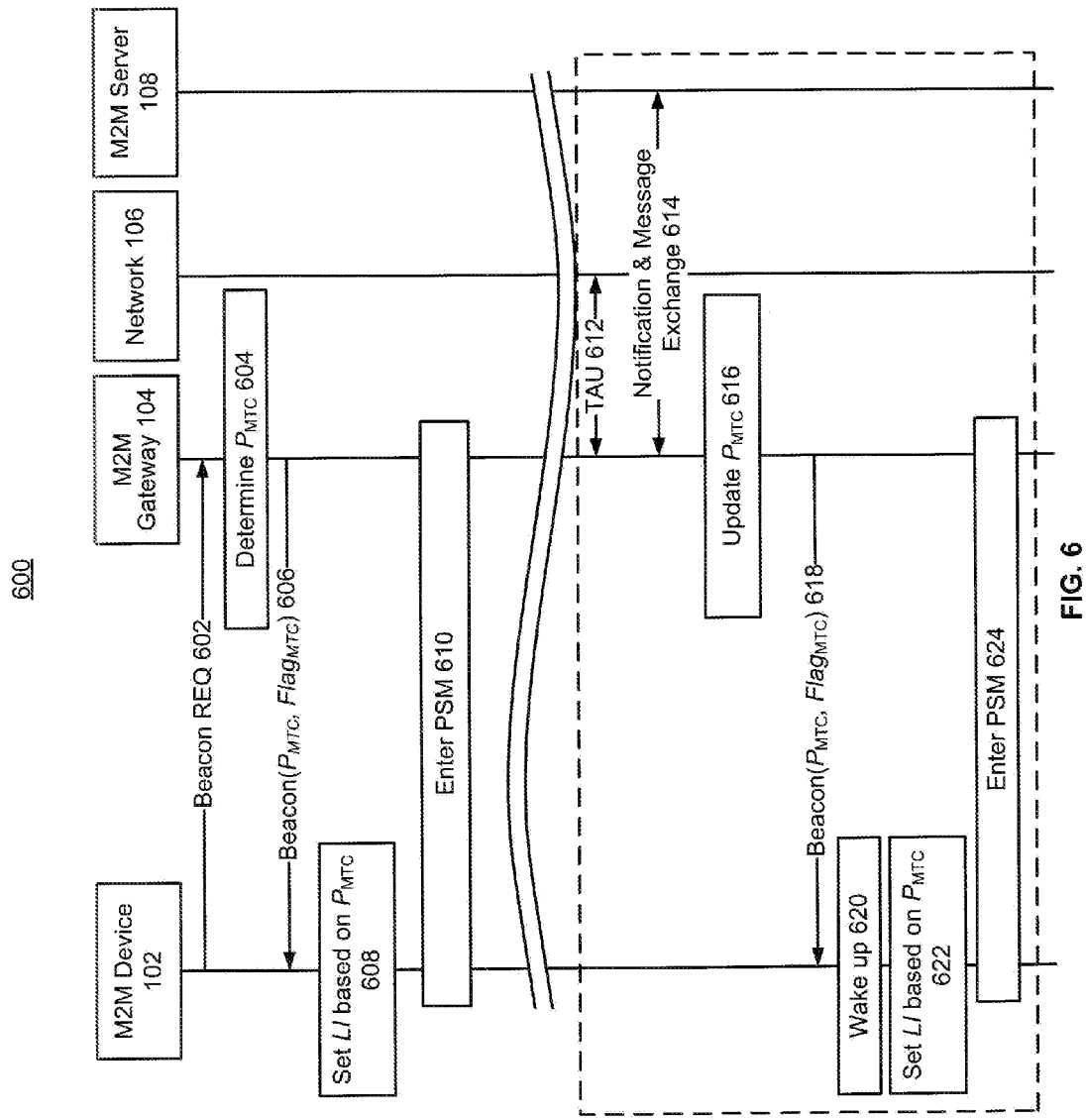
FIG. 6 illustrates a signaling process for synchronizing an M2M device with an M2M gateway when the M2M device joins a network, according to an exemplary embodiment.

FIG. 6 illustrates a process 600 for operating the M2M devices 102, such as synchronizing the switching of the M2M device 102 between different operation modes with the transmission of the TAU message by the M2M gateway 104, according to an exemplary embodiment. Referring to FIGS. 1, 2A, 2B, and 6, when the M2M device 102 joins the network 110, the NIC module 206 of the M2M device 102 transmits a beacon request 602 to the WLAN module 230 of the M2M gateway 104. In response to the beacon request 602, the controller 224 of the M2M gateway 104 determines the timing parameter $P_{MTC}$ (604). The timing parameter $P_{MTC}$ may indicate the most recent TAU interval or the target beacon transmission time (TBTT), as discussed above. The M2M gateway 102 then generates a beacon signal in accordance with the IEEE 802.11 standard and inserts the timing parameter $P_{MTC}$ into, for example, the Vendor Specific field of the beacon signal. The beacon signal may further include a flag $Flag_{MTC}$ indicating that the beacon signal 606 carries the timing parameter $P_{MTC}$. Thereafter, the M2M gateway 104 then transmits the beacon signal to the M2M device 102.

Upon receiving the beacon signal, the controller 208 of the M2M device 102 sets the Listen Interval based on the timing parameter $P_{MTC}$ (608) and stores the Listen Interval in the memory module 210. Thereafter, the controller 208 causes the M2M device 102 to periodically enter the power-saving mode (PSM) in accordance with the set Listen Interval (610). On the other hand, the M2M gateway 104 may also enter the PSM in accordance with the TAU interval (610).

As further depicted in FIG. 6, during the operation of the M2M gateway 104, the TAU interval may change due to certain events as specified in the 3GPP standard. For example, the M2M gateway 104 may update the TAU interval by exchanging TAU messages and notifications (612 and 614) with the network 106 through the NIC module 212, as defined in the 3GPP standard. The controller 224 of the M2M gateway then updates the timing parameter $P_{MTC}$ based on the new TAU interval (616) and transmits the updated timing parameter $P_{MTC}$ and the $Flag_{MTC}$ in a beacon signal to the M2M device 102 (618).

If the M2M device 102 is in the power-saving mode, the controller 208 waits until the M2M device 102 wakes up at the end of the Listen Interval (620) to receive the timing parameter $P_{MTC}$ and sets the new Listen Interval based on the timing parameter $P_{MTC}$ (622). If, on the other hand, the M2M device 102 is in the normal operation mode, the controller 208 of the M2M device 102 immediately updates the Listen Interval based on the received timing parameter $P_{MTC}$ (622).

Thereafter, the controller 208 causes the M2M device 102 to enter the PSM with the new Listen Interval (624). The controller 224 of the M2M gateway 104 also causes the M2M gateway 104 to enter the PSM with the new TAU interval (624). Hence, the operation of the M2M device 102 remains synchronized with the operation of the M2M gateway after the change in the TAU interval. The steps of 612, 614, 616, 618, 620, 622, and 624 may be perform iteratively.

Figure 7:
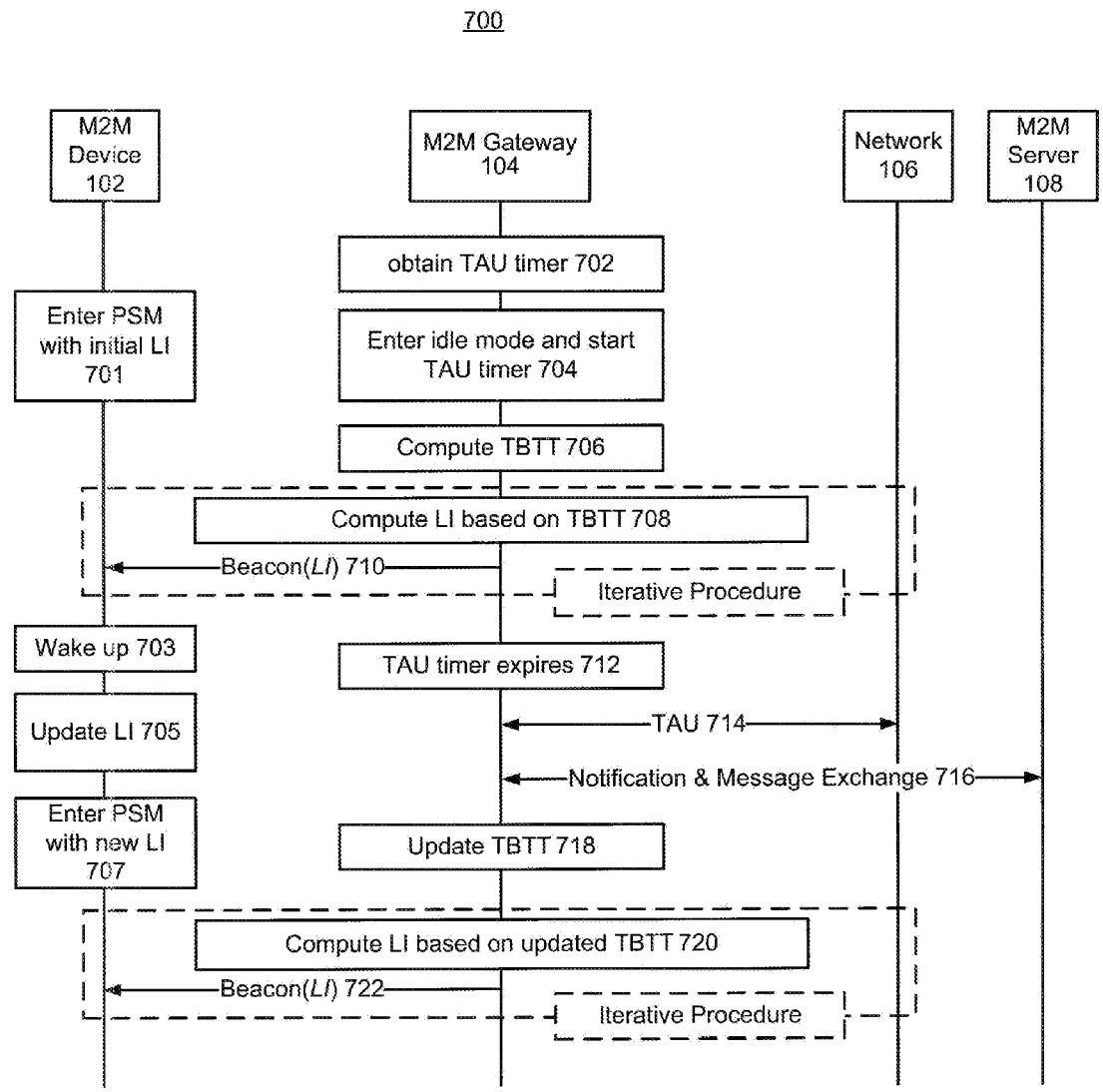
FIG. 7 illustrates a signaling process for an M2M gateway to transmit periodic beacon signals to an M2M device for synchronizing the M2M device with the M2M gateway, according to an exemplary embodiment.

FIG. 7 illustrates a signaling process for the M2M gateway 104 to transmit periodic beacon signals to an M2M device 102 for operating the M2M device 102, such as synchronizing the M2M device 102 with the M2M gateway 104, according to an exemplary embodiment. Referring to 1, 2A, 2B, and 7, after the M2M device 102 joins the network 110 as described above in connection with FIG. 6, the controller 208 causes the M2M device 102 to periodically enter the PSM with an initial Listen Interval (701).

On the other hand, the M2M gateway 104 obtains a TAU timer (702), which has a timer length. The M2M gateway 104 obtains the TAU timer from the M2M server 108 or from the network 106 in accordance with the 3GPP standard. The controller 224 causes the M2M gateway 104 to enter the idle mode and starts the TAU timer (704). Thereafter, the controller 224 of the M2M gateway 104 computes the target beacon transmission time (TBTT) based on the TAU timer length (706) and computes the Listen Interval for the M2M device 102 based on the TBTT (708). The controller 224 of the M2M gateway 104 inserts the Listen Interval into the beacon signal as described above and causes the NIC module 210 to transmit the beacon signal to the M2M device 102 (710). During the idle mode, the M2M gateway 104 performs the steps of 708 and 710 iteratively.

Upon receiving the beacon signal, if the M2M device 102 is in the power-saving mode (i.e., doze mode), the NIC module 206 of the M2M device 102 buffers the Listen Interval carried in the beacon signal. If the M2M device 102 is in the power-saving mode, the controller 208 waits until the M2M device 102 wakes up at the end of the previous Listen Interval (703) and then sets the newly received Listen Interval (705). If, on the other hand, the M2M device 102 is in the normal operation mode when receiving the beacon signal, the controller 208 of the M2M device 102 immediately updates the Listen Interval (705). Thereafter, the controller 208 of the M2M device 102 causes the device to enter the power-saving mode with the updated Listen Interval (707).

When the TAU timer expires at the M2M gateway 104 (712), the M2M gateway 104 exchanges, through the NIC module 212, TAU messages and notifications with the network 106 and the M2M server 108 in accordance with the 3GPP standard (714 and 716). Based on the TAU messages and notifications, the controller 224 of the M2M gateway 104 updates the TBTT (718) and computes the new Listen Interval for the M2M device 102 based on the updated TBTT (720). The controller 224 of the M2M gateway 104 then inserts the new Listen Interval into the beacon signal. The NIC module 210 transmits the beacon signal with the new Listen Interval to the M2M device 102 (722). Again, the M2M gateway 104 carries out the steps of 720 and 722 iteratively.

Figure 8:
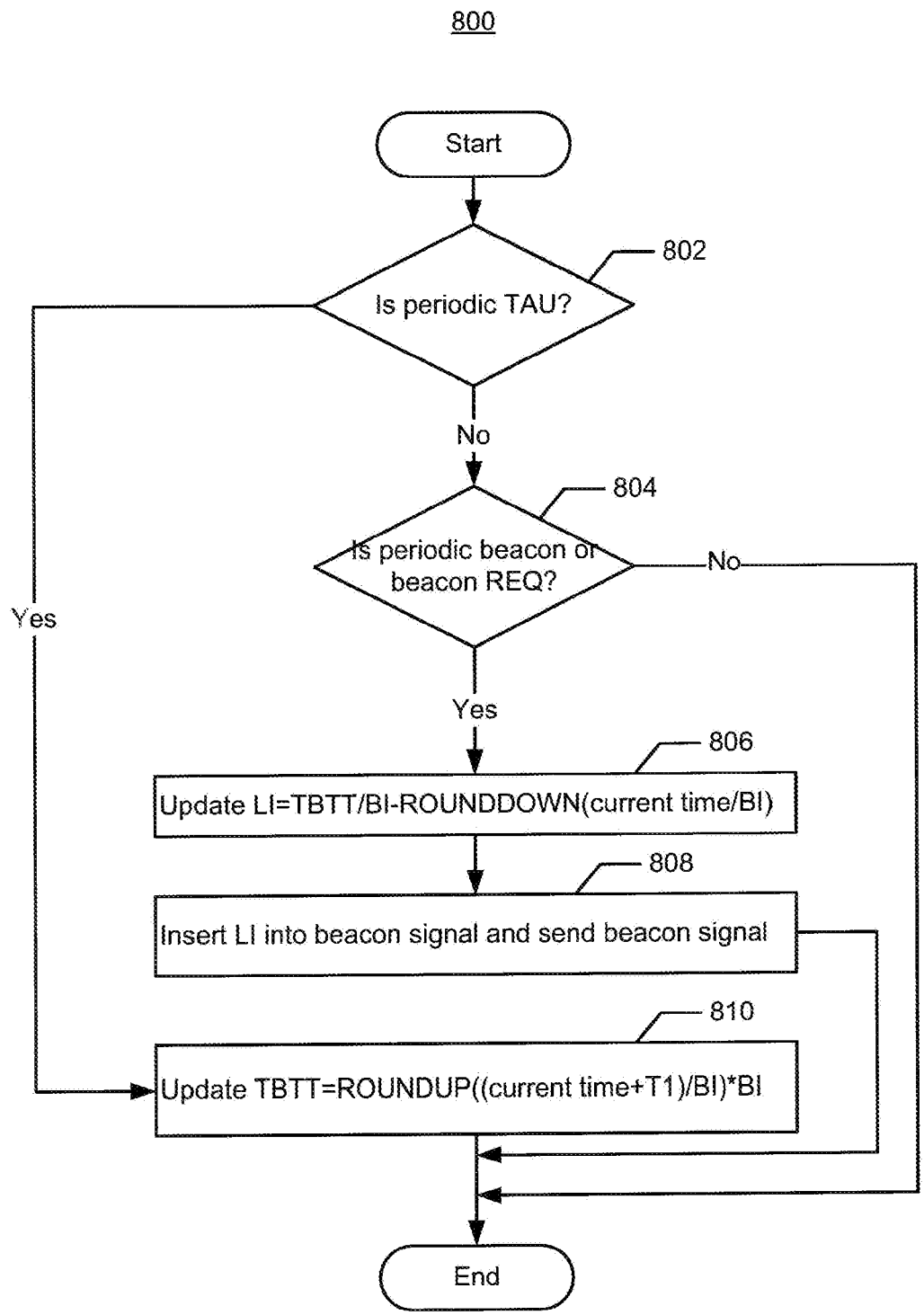
FIG. 8 illustrates a flowchart of a method for an M2M gateway to update a target beacon transmission time (TBTT) and to calculate a Listen Interval (LI) for M2M devices, according to an exemplary embodiment.

In exemplary embodiments, the Listen Interval for the M2M devices 102 may be calculated by either the M2M gateway 104 or the M2M devices 102. FIG. 8 illustrates a process 800 for the M2M gateway 104 to update the Listen Interval. Referring to FIGS. 1, 2B, and 8, the M2M gateway 104 first determines whether there is a periodic TAU message to be transmitted (802). If there is a periodic TAU message to be transmitted (802-Yes), the M2M gateway 104 updates the target beacon transmission time (TBTT) based on the current time and the beacon interval (BI) (810) as follows:

$$TBTT = RoundUp((currentTime + T1)/BI)*BI,$$

where T1 is a parameter for adjusting the difference between the timing of the TAU message and the timing of the beacon message. Thereafter, the process 800 ends.

If there is no periodic TAU message (802-No), the M2M gateway 104 then determines whether there is a periodic beacon signal to be transmitted or whether a beacon request is received from the M2M device 102 (804). If yes, then the M2M gateway 104 updates the Listen Interval (LI) for the M2M device 102 based on the TBTT, the current time, and the beacon interval (BI) (806) as follows:

$$LI = TBTT/BI - RoundDown(currentTime/BI).$$

The M2M gateway 104 then inserts the Listen Interval into the beacon signal as described above and sends the beacon signal to the M2M device 102 (808). The Listen Interval may be carried in the Vendor Specific field of the beacon signal as defined in the IEEE 802.11 standard. Thereafter, the process 800 ends. If there is neither periodic beacon signals nor beacon requests received from the M2M devices 102 (804-No), the process 800 also ends.

Figure 9:
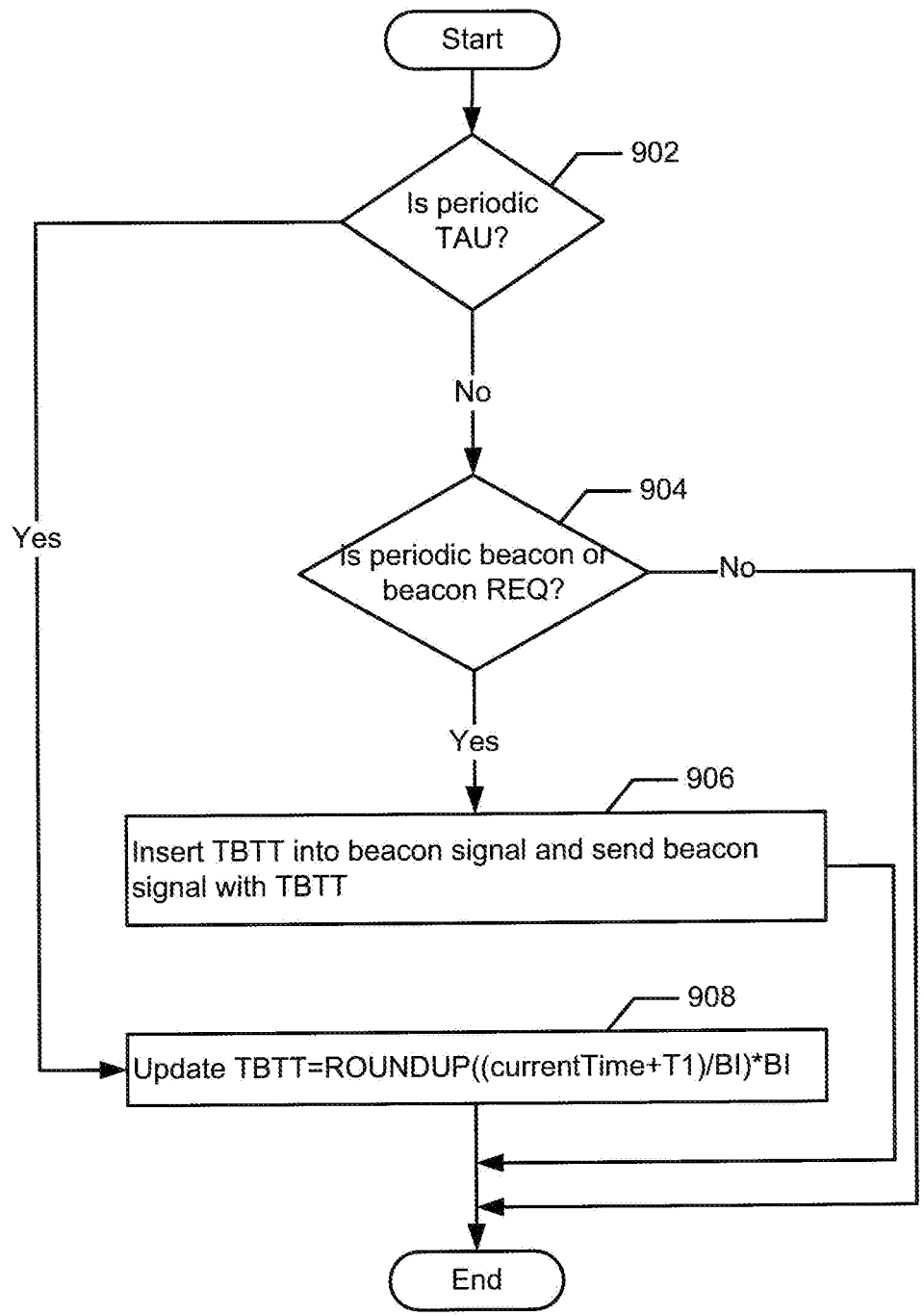
FIG. 9 illustrates a flowchart of a method for an M2M gateway to update the target beacon transmission time (TBTT) and to transmit the same to an M2M device, according to an exemplary embodiment.

FIG. 9 illustrates a process 900 for the M2M gateway 104 to update the target beacon transmission time (TBTT) and transmit the same to the M2M devices 102. Referring to FIGS. 1, 2B, and 9, the M2M gateway 104 first determines whether there is a periodic TAU message to be transmitted (902). If there is a periodic TAU message to be transmitted (902-Yes), the M2M gateway 104 updates the target beacon transmission time (TBTT) based on the current time and the beacon interval (BI) (908) as follows:

$$TBTT = Round\ Up((currentTime + T1)/BI)*BI.$$

Thereafter, the process 900 ends.

If there is no periodic TAU message (902-No), the M2M gateway 104 then determines whether there is a periodic beacon signal to be transmitted or whether a beacon request is received from the M2M device 102 (904). If yes (904-Yes), then the M2M gateway 104 inserts the TBTT into the beacon signal and sends the beacon signal with the TBTT to the M2M device 102 (908). The TBTT may be carried in the Vendor Specific field of the beacon signal as defined in the IEEE 802.11 standard. Thereafter, the process 900 ends. If there is neither periodic beacon signals nor beacon requests received from the M2M device 102 (904-No), the process 900 also ends.

Figure 10:
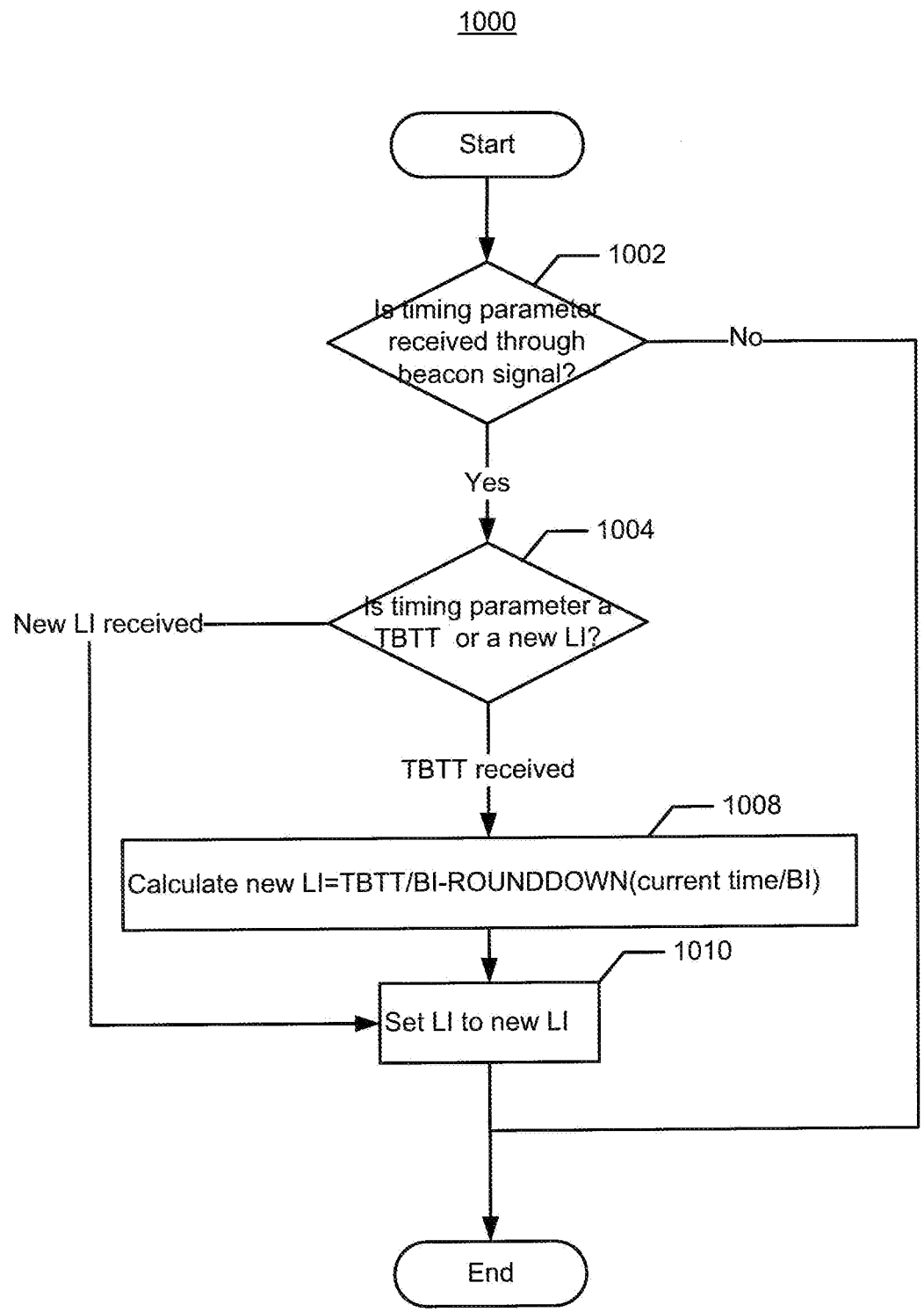
FIG. 10 illustrates a flowchart of a method for an M2M device to update the Listen Interval (LI) based on the target beacon transmission time (TBTT), according to an exemplary embodiment.

FIG. 10 illustrates a process 1000 for the M2M device 102 to update the Listen Interval based on the timing parameter received through the beacon signal, according to exemplary embodiments. Referring to FIGS. 1, 2A, and 10, the M2M device 102 first determines whether a timing parameter is received through a beacon signal (1002). As discussed above, the timing parameter may be carried in the Vendor Specific field of the beacon signal as defined in the IEEE 802.11 standard. The beacon signal may further carry a flag indicating whether the beacon signal carries the timing parameter. If the M2M device 102 does not receive the timing parameter (1002-No), the process 1000 ends.

If, on the other hand, the M2M device 102 receives a timing parameter through the beacon signal (1002-Yes), the M2M device 102 further determines whether the timing signal is a TBTT or a new Listen Interval (LI) (1004). If the timing parameter indicates a new Listen Interval (1004-New LI received), the M2M device 102 sets its Listen Interval to the new Listen Interval (1010). If the timing parameter is a TBTT (1004-TBTT received), the M2M device 102 first calculates the new Listen Interval based on the received TBTT, the current time, and the beacon interval (BI) (1008) as follows:

$$LI=TBTT/BI-RoundDown(currentTime/BI).$$

The M2M device 102 then sets its Listen Interval to the new Listen Interval as calculated above (1010). Thereafter, the process 1000 ends.

While embodiments have been described based on the 3GPP network, the invention is not so limited. It may be practiced with equal effectiveness with other wireless networks operating in accordance with a communication standard, such as a wireless network operating in accordance with a Worldwide Interoperability for Microwave Access (WiMAX) standard.

Other embodiments of the invention will be apparent to those skilled in the art from consideration of the specification and practice of the embodiments disclosed herein. The scope of the invention is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A method for operating a machine-to-machine device in a wireless network, comprising:
switching a gateway between a first mode and a second mode according to a first time interval, to facilitate a machine-to-machine device to save power, wherein the gateway is connected between a first network and a second network and configured to periodically transmit, according to the first time interval, a message including information from the machine-to-machine device in the second network to a server in the first network;
determining, by the gateway, a timing parameter for a machine-to-machine device based on the first time interval; and
transmitting, by the gateway, a control signal including the timing parameter to the machine-to-machine device, the control signal causing the machine-to-machine device to adjust a second time interval for switching between the first mode and the second mode in accordance with the first time interval, wherein the adjusted second time interval is equal to the first time interval;
wherein the timing parameter is determined by determining a target beacon transmission time (TBTT) based on a current time (currentTime) and a beacon interval (BI) as follows:

$$TBTT=RoundUp((currentTime+T1)/BI)*BI,$$

T1 being a parameter for adjusting a timing difference between the message to be transmitted and a beacon message, and RoundUp being an operation to round up a non-integer to a next integer.

2. The method of claim 1, further comprising:
obtaining a timer having a timer length;
starting the timer; and
transmitting the message to the server each time the timer expires.

3. The method of claim 2, wherein the timer length is equal to
the first time interval.

4. The method of claim 2, further comprising periodically adjusting the first time interval.

5. The method of claim 4, further comprising adjusting the first time interval upon expiration of the timer.

6. The method of claim 1, wherein the timing parameter defines
a target beacon transmission time for the gateway to transmit a next control signal, and
the method further comprises:
determining the target beacon transmission time based on a beacon interval and the first time interval.

7. The method of claim 1, wherein the control signal is in compliance with the IEEE 802.11 standard, and the method further comprises inserting, by the gateway, the timing parameter into a vendor specific field of the control signal.

8. The method of claim 1, further comprising determining the timing parameter in response to a change in the first time interval.

9. The method of claim 6, wherein the second time interval includes one or more beacon intervals, and the control signal causes the machine-to-machine device to transmit a periodic beacon signal according to the second time interval.

10. The method of claim 9, further comprising:
determining a target beacon transmission time and a current time; and
calculating the timing parameter based on the beacon interval, the target beacon transmission time, and the current time.

11. The method of claim 1, wherein the first time interval is a Tracking Area Update interval and the message transmitted by the gateway according to the first time interval is a Tracking Area Update message.

12. The method of claim 1, wherein the first network includes a 3GPP network.

13. A non-transitory computer-readable medium comprising program codes, which, when executed by a processor, cause the processor to perform a method at a gateway for operating a machine-to-machine device in a wireless network, the method comprising:
switching the gateway between a first mode and a second mode according to a first time interval, to facilitate a machine-to-machine device to save power, wherein the gateway is connected between a first network and a second network and configured to periodically transmit, according to the first time interval, a message including information from the machine-to-machine device in the second network to a server in the first network;
determining a timing parameter for a machine-to-machine device based on the first time interval; and
transmitting a control signal including the timing parameter from the gateway to the machine-to-machine device, the control signal causing the machine-to-machine device to adjust a second time interval for switching between the first mode and the second mode in accordance with the first time interval, wherein the adjusted second time interval is equal to the first time interval;
wherein the timing parameter is determined by determining a target beacon transmission time (TBTT) based on a current time (currentTime) and a beacon interval (BI) as follows:

TBTT=RoundUp((currentTime+$T1$)/BI)*BI,

T1 being a parameter for adjusting a timing difference between the message to be transmitted and a beacon message, and RoundUp being an operation to round up a non-integer to a next integer.

14. A method for operating a machine-to-machine device in a wireless network, comprising:
periodically switching a machine-to-machine device in a second network between a first operation mode and a second operation mode in accordance with a time interval;
receiving, by the machine-to-machine device from a gateway, a control signal carrying a timing parameter based on timing of switching the gateway between the first operation mode and the second operation mode, wherein the timing parameter indicates a gateway mode switch time interval for the gateway to periodically transmit a message including information from the machine-to-machine device to a server in a first network, and the switching of the gateway between the first operation mode and the second operation mode facilitates the machine-to-machine device to save power;
extracting the timing parameter from the control signal; and
synchronizing the switching of the machine-to-machine device with the switching of the gateway by adjusting the time interval in accordance with the timing parameter, wherein the adjusted time interval is equal to the gateway time interval;
wherein the timing parameter is determined by determining a target beacon transmission time (TBTT) based on a current time (currentTime) and a beacon interval (BI) as follows:

TBTT=RoundUp((currentTime+$T1$)/BI)*BI,

T1 being a parameter for adjusting a timing difference between the message to be transmitted and a beacon message, and RoundUp being an operation to round up a non-integer to a next integer.

15. The method of claim 14, wherein the machine-to-machine device consumes less energy in the first operation mode than in the second operation mode.

16. The method of claim 15, further comprising updating, by the machine-to-machine device, the time interval upon exiting the first operation mode.

17. The method of claim 14, wherein the timing parameter defines the time interval.

18. The method of claim 14, wherein the timing parameter defines a target beacon transmission time, and the target beacon transmission time indicates timing of a next control signal transmitted by the gateway.

19. The method of claim 18, further comprising calculating the time interval based on the target beacon transmission time, a current time, and a beacon interval.

20. The method of claim 14, wherein the control signal is in compliance with the IEEE 802.11 standard, and the timing parameter is carried in a vendor specific field of the control signal.

21. The method of claim 14, further comprising synchronizing the switching of the machine-to-machine device from the first operation mode to the second operation mode with a transmission of messages by the gateway to the second network.

22. The method of claim 21, further comprising switching, by the machine-to-machine device, from the first operation mode to the second operation mode after the gateway transmits a Tracking Area Update (TAU) message to the second network.

23. A non-transitory computer-readable medium comprising program codes, which, when executed by a processor, cause the processor to perform a method for operating a machine-to-machine device in a wireless network, the method comprising:
periodically switching a machine-to-machine device in a second network between a first operation mode and a second operation mode in accordance with a time interval;
receiving from a gateway a control signal carrying a timing parameter based on timing of switching the gateway between the first operation mode and the second operation mode, wherein the timing parameter indicates a gateway time interval for the gateway to periodically transmit a message including information from the machine-to-machine device to a server in a first network, and the switching of the gateway between the first operation mode and the second operation mode facilitates the machine-to-machine device to save power;
extracting the timing parameter from the control signal; and
synchronizing the switching of the machine-to-machine device with the switching of the gateway by adjusting the time interval in accordance with the timing parameter, wherein the adjusted time interval is equal to the gateway time interval;
wherein the timing parameter is determined by determining a target beacon transmission time (TBTT) based on a current time (currentTime) and a beacon interval (BI) as follows:

TBTT=RoundUp((currentTime+$T1$)/BI)*BI,

T1 being a parameter for adjusting a timing difference between the message to be transmitted and a beacon message, and RoundUp being an operation to round up a non-integer to a next integer.

24. A method for operating a machine-to-machine device in a wireless network, the method comprising:
switching a gateway between a first mode and a second mode according to a first time interval, to facilitate the machine-to-machine device to save power, and switching the machine-to-machine device between the first mode and the second mode according to a second time interval, wherein the gateway is connected between a first network and a second network;

periodically transmitting, by the gateway according to the first time interval, a message including information from the machine-to-machine device in the second network to a server in the first network;

obtaining, by the gateway, a timing parameter for the machine-to-machine device based on the first time interval;

transmitting a control signal including the timing parameter from the gateway to the machine-to-machine device through a first network;

extracting, by the machine-to-machine device, the timing parameter from the control signal; and adjusting the second time interval of switching the machine-to-machine device in accordance with the first time interval of switching the gateway, wherein the adjusted second time interval is equal to the first time interval;

wherein the timing parameter is determined by determining a target beacon transmission time (TBTT) based on a current time (currentTime) and a beacon interval (BI) as follows:

$$TBTT = RoundUp((currentTime+T1)/BI)*BI,$$

T1 being a parameter for adjusting a timing difference between the message to be transmitted and a beacon message, and RoundUp being an operation to round up a non-integer to a next integer.

25. The method of claim 24, further comprising:
updating, by the gateway, the first time interval; and
determining the timing parameter based on the updated first time interval.

26. The method of claim 24, wherein the timing parameter defines a target beacon transmission time for transmitting a future control signal from the gateway to the machine-to-machine device, and the method further comprises:
calculating, by the machine-to-machine device, a time length of the first mode based on the target beacon transmission time, a current time, and a beacon interval.

27. A system for operating a machine-to-machine device in a wireless network, comprising:
a gateway connected between a first network and a second network, the gateway configured to:
switch between a first mode and a second mode according to a first time interval, to facilitate the machine-to-machine device to save power,
periodically transmit, according to the first time interval, a message including information from a machine-to-machine device in the second network to a server in the first network,
determine a timing parameter based on the first time interval, and
transmit a control signal including the timing parameter through a first network; and
the machine-to-machine device connected to the first network, the machine-to-machine device configured to:
switch between the first mode and the second mode according to a second time interval,
receive the control signal, extract the timing parameter from the control signal, and
adjust the second time interval of switching the machine-to-machine device in accordance with the first time interval, wherein the adjusted second time interval is equal to the first time interval;
wherein the timing parameter is determined by determining a target beacon transmission time (TBTT) based on a current time (currentTime) and a beacon interval (BI) as follows:

$$TBTT = RoundUp((currentTime+T1)/BI)*BI,$$

T1 being a parameter for adjusting a timing difference between the message to be transmitted and a beacon message, and RoundUp being an operation to round up a non-integer to a next integer.

* * * * *